(12) United States Patent
Saxon et al.

(10) Patent No.: US 11,661,969 B2
(45) Date of Patent: *May 30, 2023

(54) COVER ASSEMBLY FOR BEARING

(71) Applicant: Dodge Industrial Inc., Oxford, CT (US)

(72) Inventors: James G. Saxon, Russellville, TN (US); Tyler J. Erickson, Easley, SC (US); Thomas E. Kuckhoff, Greenville, SC (US); William G. Hewitt, Taylors, SC (US); Marshall C. Corbett, Belton, SC (US); Matthew J. Kelly, Greenville, SC (US)

(73) Assignee: Dodge Industrial, Inc., Oxford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,020

(22) Filed: Jan. 21, 2022

(65) Prior Publication Data

US 2022/0145937 A1 May 12, 2022

Related U.S. Application Data

(63) Continuation of application No. 16/874,287, filed on May 14, 2020, now Pat. No. 11,306,782.

(51) Int. Cl.
*F16C 35/04* (2006.01)
*F16C 33/72* (2006.01)

(52) U.S. Cl.
CPC .......... *F16C 35/042* (2013.01); *F16C 33/723* (2013.01)

(58) Field of Classification Search
CPC .. F16C 33/723; F16C 33/7816; F16C 33/783; F16C 33/7886; F16C 35/04; F16C 35/042; F16C 35/047
See application file for complete search history.

(56) References Cited

U.S. PATENT DOCUMENTS

| | | | | |
|---|---|---|---|---|
| 3,734,579 A | * | 5/1973 | Schumacher | F16C 33/723 301/108.3 |
| 5,195,807 A | * | 3/1993 | Lederman | F16C 33/726 301/108.3 |
| 5,328,276 A | * | 7/1994 | Linteau | F16C 33/76 384/477 |
| 6,283,635 B1 | | 9/2001 | Downey et al. | |
| 8,888,372 B2 | * | 11/2014 | Ciulla | F16C 41/007 384/546 |
| 8,939,005 B2 | * | 1/2015 | Breen | B21K 1/76 72/456 |
| 11,306,782 B2 | * | 4/2022 | Saxon | F16C 35/042 |
| 2008/0069489 A1 | | 3/2008 | Drake et al. | |

* cited by examiner

*Primary Examiner* — James Pilkington
(74) *Attorney, Agent, or Firm* — Robinson & Cole LLP

(57) ABSTRACT

A bearing cover assembly can be assembled to a bearing housing in which a rolling element bearing is accommodated. The bearing housing assembly includes an annular adapter and an end cap that can be mated together. The annular adapter can have a tapered inner annular surface and can be inserted into the housing bore of the bearing housing. The end cap can have a corresponding outer tapered surface. When the end cap is inserted into the adapter hole defined by the annular adapter, the sliding contact between the tapered inner annular surface and the outer surface radially expands the annular adapter inside the housing bore creating a positive engagement retaining the bearing cover assembly to the bearing housing.

21 Claims, 8 Drawing Sheets

COVER ASSEMBLY FOR BEARING

CROSS REFERENCE TO RELATED APPLICATION

This application is a continuation application of and claims priority to commonly owned and co-pending U.S. application Ser. No. 16/874,287, filed on May 14, 2020, the contents of which are incorporated herein by reference in its entirety.

FIELD OF THE INVENTION

The present disclosure relates to rolling element bearings and, more particularly, to cover assemblies for protecting bearings.

BACKGROUND OF THE INVENTION

Rolling element bearings are anti-friction devices used to rotatably support shafts in industrial settings and mechanical equipment. Rolling element bearings include a plurality of rolling elements such as spherical balls or cylindrical rollers that are located between inner and outer bearing rings, referred to as races, and the rolling elements are arranged so that they can roll along the inner and outer circumferences of the respective inner and outer bearing races. The rolling elements enable the inner and outer bearing races to rotate with respect to each other. A rotating shaft that is fixedly mounted to the inner bearing race can thus rotate with respect to the outer bearing race that may be fixedly mounted to a stationary supporting structure.

The rolling element bearings may be supported in a bearing housing such as, for example, a pillow block housing or a flange housing that mounts the bearing to the supporting structure. The bearing housing may be made of cast iron or a similar structural material to rigidly support the bearing and transfer loads from the shaft to the supporting structure. The bearing housing includes a housing bore disposed through the structure in which the rolling element bearing is located. The shaft can extend into the housing bore from either side of the housing structure. In some embodiments, the axial end of the shaft may be located in the bearing housing such that the shaft is anchored by the rolling element bearing mounted therein, while in other embodiments the shaft may extend through the bearing housing.

To cover the housing bore, for example, to prevent unintended contact with the rotating shaft therein and to prevent contamination and debris from interfering with the bearing, bearing covers may be attached to the bearing housing. Common attachment mechanisms include using bolts or set screws to fasten the bearing cover to the housing or press-fitting a polymer cap into the housing bore. Such attachments methods, however, require that machining processes be undertaken, or the cover may unintentionally dislodge due to incidental contact. These attachment methods may further require compatibility between the style and/or dimension of the bearing housing and the corresponding bearing cover. The present disclosure is directed to an improved bearing cover assembly to facilitate attachment to a bearing housing.

SUMMARY OF THE INVENTION

The disclosure describes a bearing cover assembly for enclosing the housing bore of a bearing housing accommodating a rolling element bearing that may be used to support a rotating shaft. The bearing cover assembly includes an annular adapter and an end cap that can be mated together. The annular adapter may be inserted into the housing bore of the bearing housing and includes a tapered inner annular surface that defines an adapter hole. The end cap can include a tapered outer surface that may generally correspond in dimension to the tapered annular inner surface of the annular adapter. When the end cap is inserted into the annular adapter, sliding contact between the tapered inner annular surface and the tapered outer surface radially expands the annular adapter in the housing bore, thereby positively retaining the bearing cover assembly to the bearing housing through a mechanical engagement. The annular adapter may include axially extending first and second latch arms that can extend around the end cap and that can be received in corresponding recesses disposed on the end cap. A radially inward barb on the distal end of the latch arms can catch on the recesses to secure the annular adapter and end cap together.

In one aspect, the present disclosure described a bearing cover assembly. The bearing assembly includes an annular adapter and an end cap. The annular adapter includes an adapter sleeve that is configured for axial insertion into a bearing housing bore of a bearing housing. The adapter sleeve includes a tapered inner annular surface. The annular adapter includes an intermediate shoulder flange that extends between a first axial end and a second axial end thereof. The first axial end is configured to abut against the bearing housing. The annular adapter includes a first latch arm and a second latch arm that each extend axially from the second axial end of the intermediate shoulder flange. The first latch arm and the second latch arm each include a radially inward directed barb at a distal end thereof. The end cap includes a tapered insert with a circumferential wall that extends axially from an axial face panel and is configured for insertion into the annular adapter. The circumferential wall includes a tapered outer surface that is configured to slidingly engage the tapered inner annular surface and radially expand the adapter sleeve. One or more of the first latch arm and the second latch arm are configured to radially bear on a portion of the end cap.

In some embodiments, one or more of the first latch arm and the second latch arm are configured to radially bear on the tapered outer surface of the end cap.

In some embodiments, one or more of the first latch arm and the second latch arm include a fastener therein that is oriented to radially bear on the tapered outer surface of the end cap.

In some embodiments, the circumferential wall includes a first recess and a second recess that are each radially disposed into and arcing partially about the circumferential wall. The first recess is configured to receive the radially inward directed barb of the first latch arm and the second recess is configured to receive the radially inward directed barb of the second latch arm.

In some embodiments, one or more of the first latch arm and the second latch arm are configured to radially bear on the first recess or the second recess.

In some embodiments, one or more of the first latch arm and the second latch arm include a fastener therein that is oriented to radially bear on the first recess or the second recess. In some embodiments, the fastener is threaded. In some embodiments, the fastener is a set screw.

In some embodiments, the first recess and the second recess each include a radial ledge to form a snap-fit with the radially inward barbs of the first latch arm and the second latch arm.

In some embodiments, the first recess and the second recess each include a bayonet slot to form a bayonet mount with the radially inward directed barbs of the first latch arm and the second latch arm.

In some embodiments, the end cap is formed of a first semicircular part and a second semicircular part clamped together.

In some embodiments, the end cap defines a central aperture when the first semicircular part and the second semicircular part are clamped together.

In some embodiments, the annular adapter defines a split cut facilitating radial expansion of the annular adapter.

In some embodiments, the split cut axially traverses the annular adapter.

In another aspect, the present disclosure describes a method of dissembling a bearing cover assembly from a bearing housing. The method includes providing a fastener in a radially extending hole in a latch arm of an annular adapter, the latch arm having a radially inward directed barb disposed thereon; and radially pressing the fastener against a circumferential wall of an end cap thereby radially outwardly displacing the radially inward directed barb with respect to the circumferential wall thereby releasing the radially inward directed barb from the end cap.

In some embodiments, the method includes removing the end cap from the annular adapter by axially slidingly disengaging a tapered outer surface of the circumferential wall of the end cap from a tapered inner annular surface of the annular adapter.

In some embodiments, the method includes radially compressing the annular adapter and axially pulling the annular adapter out of a housing bore of the bearing housing to remove the annular adapter from the bearing housing.

In some embodiments, the method includes, after the radially pressing step, twisting the end cap with respect to the annular adapter to disengage the radially inward directed barb from a bayonet slot disposed in a recess radially disposed into the circumferential wall of the end cap.

In some embodiments, the fastener is oriented to radially bear on a tapered outer surface of the circumferential wall of the end cap.

In some embodiments, the fastener is oriented to radially bear on a recess radially disposed into the circumferential wall of the end cap.

In some embodiments, the adapter sleeve extends axially from a first portion of the annular adapter and the latch arm extends axially from a second portion of the annular adapter. The second portion is opposite the first portion.

A possible advantage of the disclosure is that the bearing cover assembly is securely and positively engaged to the bearing housing so as to prevent unintentional dislodgement of the bearing cover assembly. Another possible advantage is that the ability of the annular adapter to radially expand or contract with respect to the housing bore enables the bearing cover assembly to possibly fit a variety of bearing housings. These and other possible advantages and features will be apparent from the following detailed description and accompanying drawings.

DETAILED DESCRIPTION OF THE INVENTION

Figure 1:
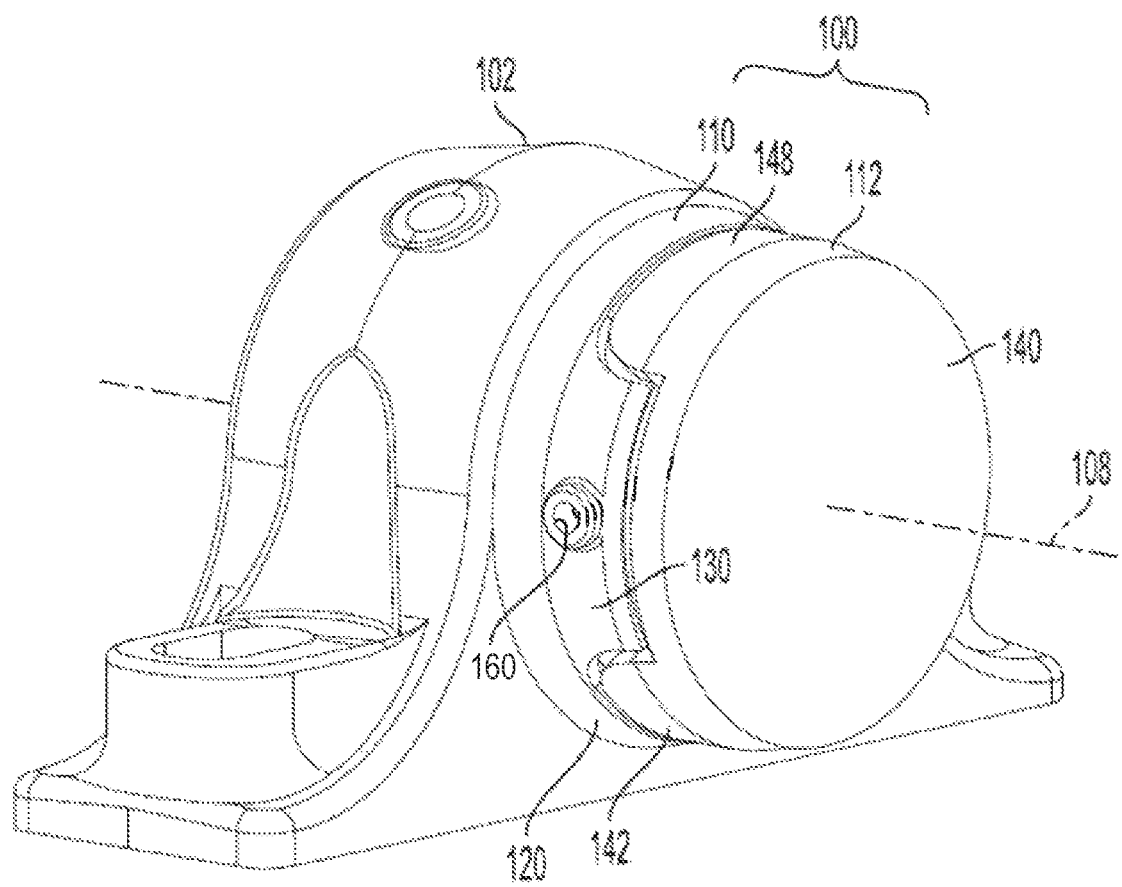
FIG. 1 is a perspective view of a bearing cover assembly with a two-piece configuration including an annular adapter and an end cap as mounted to a bearing housing.

Now referring generally to FIGS. 1-4 where, whenever possible, like reference numbers will refer to like elements, there is illustrated a bearing cover assembly 100 configured for attachment to a bearing housing 102 which defines a circular housing bore 104 disposed through it and in which a rolling element bearing 106 can be accommodated. The housing bore 104 and rolling element bearing 106 define an axis line 108 extending there through. In addition to being used on a bearing housing, in various applications the cover assembly 100 can be used on an enclosed gear box. When a rotating shaft is supported in the bearing housing 102, it can align and rotate with respect to the axis line 108. The bearing housing 102 may be configured as a pillow block as illustrated that can mount to a supporting structure that supports the loads transmitted from the shaft. The bearing housing 102 can be made of cast iron or a similar rigid material of suitable strength and may include lubrication ports or grease fasteners to receive lubrication for the rolling element bearing 106. In accordance with the disclosure, however, the bearing housing 106 may have other suitable configurations and be made of other materials.

To enclose the exposed aperture of the housing bore 104 on either side of the bearing housing 102, the bearing cover assembly 100 can have a two-piece construction configured to be assembled to and engage the bearing housing 102. The bearing cover assembly 100 can include an annular adapter 110 that may be partially inserted into the housing bore 104 and an end cap 112 that can be mated with the annular adapter 110 in a manner that expands the bearing cover assembly 100 to positively engage the housing bore 104. The annular adapter 110 and the end cap 112 can be made from a molded thermoplastic material or steel having a resilient or flexible characteristic that enables the annular adapter 110 to radially expand within the housing bore 104 and secure the bearing cover assembly 100 to the bearing housing 102.

Figure 2:
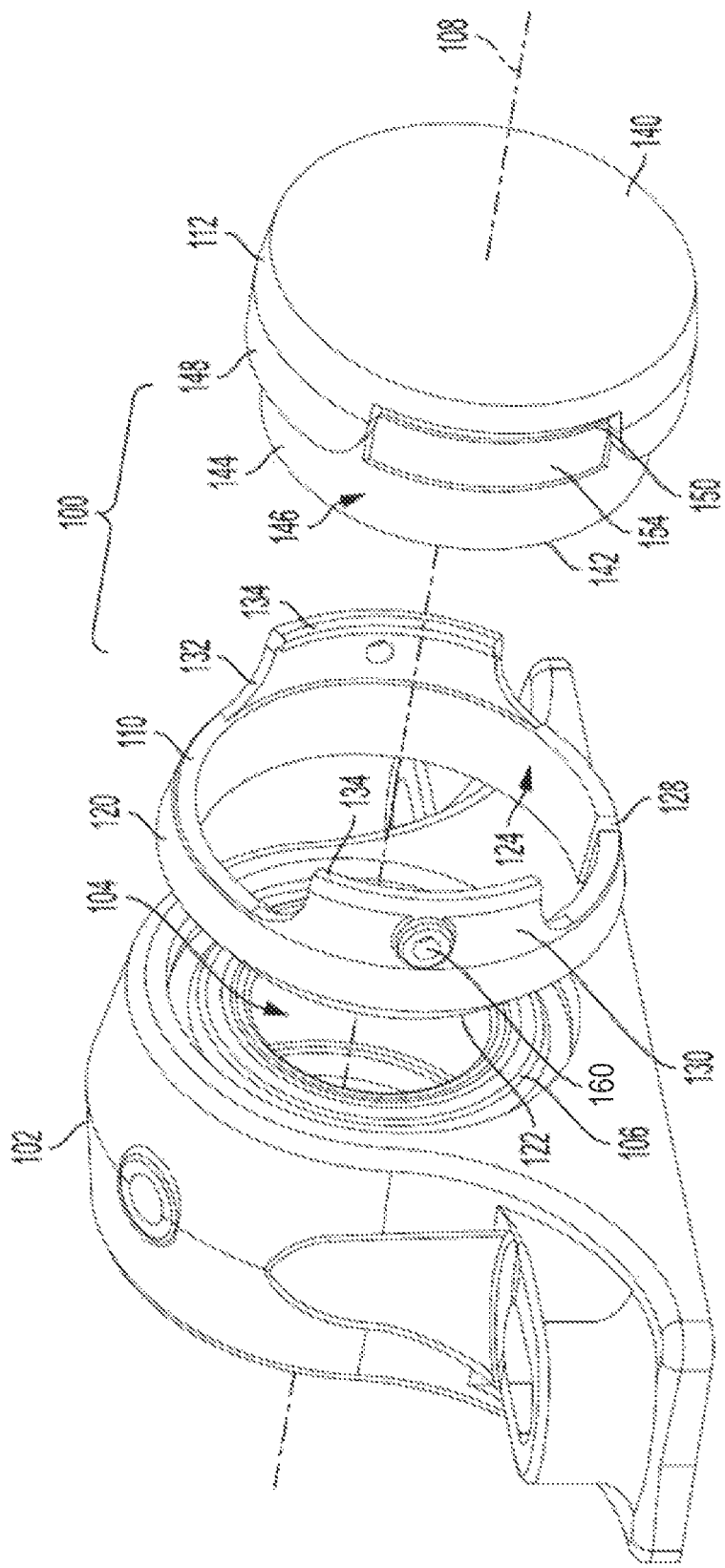
FIG. 2 is a perspective assembly view of the bearing cover assembly in relation to the bearing housing illustrating the method of attachment.
Figure 3:
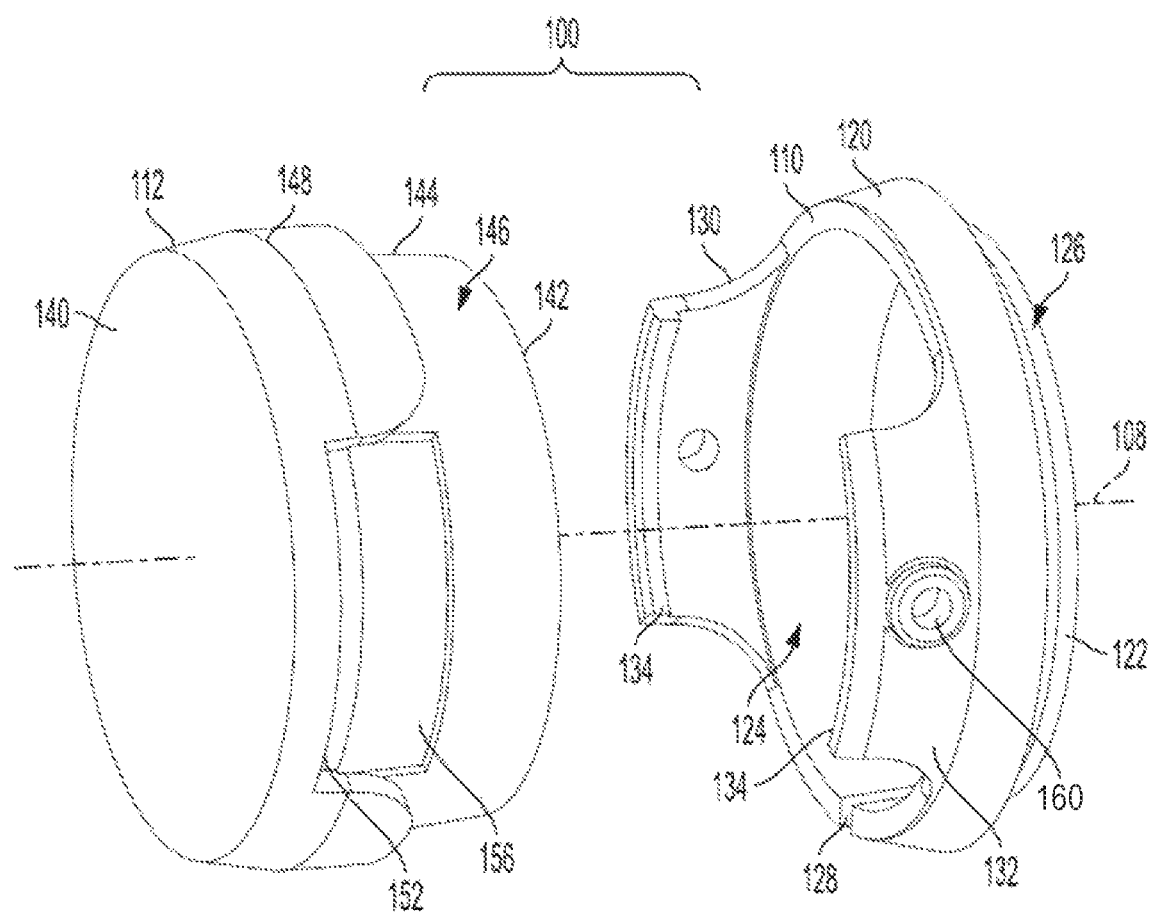
FIG. 3 is a perspective assembly view of the bearing cover assembly illustrating axially projecting latch arms extending from the annular adapter in relation to corresponding recesses disposed on the end cap.

Referring to FIGS. 2 and 3, to mate with the end cap 112, the annular adapter 110 can be an annular, ring-like structure that, when assembled to the bearing housing 102, extends circumferentially about and is concentrically aligned with the axis line 108. The annular adapter 110 can include an intermediate shoulder flange 120 that may be sized and dimensioned slightly larger than the housing bore 104 and configured to axially abut against the face of the bearing housing 102 into which the housing bore 104 is disposed. For axial insertion into the housing bore 104, the annular adapter 110 includes an annular, ring-like adapter sleeve 122 that extends axially rearward from the intermediate shoulder flange 120 and that is sized smaller in diameter than the intermediate shoulder flange 120. The rolling element bearing 106 may be set back into the housing bore 104 to provide a stepped clearance to accommodate the adapter sleeve 122. The intersection between the intermediate shoulder flange 120 and the adapter sleeve 122 provides an annular shoulder that can be dimensioned and shaped to abut against the corresponding intersection between the face of the bearing housing 102 and the bearing bore 104 and that may limit the axial insertion of the adapter sleeve 122 into the housing bore 104.

To facilitate alignment and sliding contact with the end cap 112 when mated, the annular adapter 110 can include a tapered inner annular surface 124 that is radially oriented towards and circumferentially extends about the axis line 108. The tapered inner annular surface 124 may taper radially inward towards the axis line 108 as the inner surface of the annular adapter 110 extends rearward. As illustrated, the tapered inner annular surface 124 may be associated with the inner surfaces of the intermediate shoulder flange 120 and the adapter sleeve 122, although in other instances the tapered inner annular surface 124 may only extend over a portion of the axial length of those parts of the annular adapter 110. The outer annular surface 126 of the adapter sleeve 122 may have a similar taper such that the two surfaces are parallel, although in other instances the outer annular surface 126 may instead extend parallel with the axis line 108.

To enable the annular adapter 110 to radially contract and expand, the annular adapter 110 can be formed with a split cut 128 disposed through it and which splits the circular structure of the annular adapter 110. The split cut 128, which may be formed by cutting the annular adapter 110 over its axial length, enables the circumference of the annular adapter 110 to contract radially inwardly under radially applied compressive force and can expand radially outwardly when the force is removed due to a resilient characteristic of the material of the annular adapter 110. The split cut 128 may be parallel to the axis line 108 or may be disposed at an approximate angle to the axis line 108.

To mate with the end cap 112, the annular adapter 110 can include at least one latch arm, and may include a first latch arm 130 and a second latch arm 132, which extend axially forward of the intermediate flange 120 and which may be positioned at directly opposing locations along the circumference of the annular adapter 110. The first and second latch arms 130, 132 can be curved to correspond with the circular shape of the annular adapter 110 and may be formed as arcs that curve only partially around the axis line 108. For example, the arc length of each of the first and second latch arms 130, 132 may be less than a quarter of the 360° circumference of the annular adapter 110. The latch arms 130, 132 may be each located at approximately 90° on opposite sides with respect to the location of the split cut 128 in the annular adapter 110. To hook or grasp the end cap 112, the first and second latch arms 130, 132 can have formed at their axially forward, distal ends a radially inwardly directed catch or radially inward directed barb 134 that protrudes slightly towards the axis line 108. The radially inward directed barb 134 may be coextensive with the arc length of the first and second latch arms 130, 132 or may extend only over a portion of the arc length of the first and second latch arms 130, 132.

Figure 4:
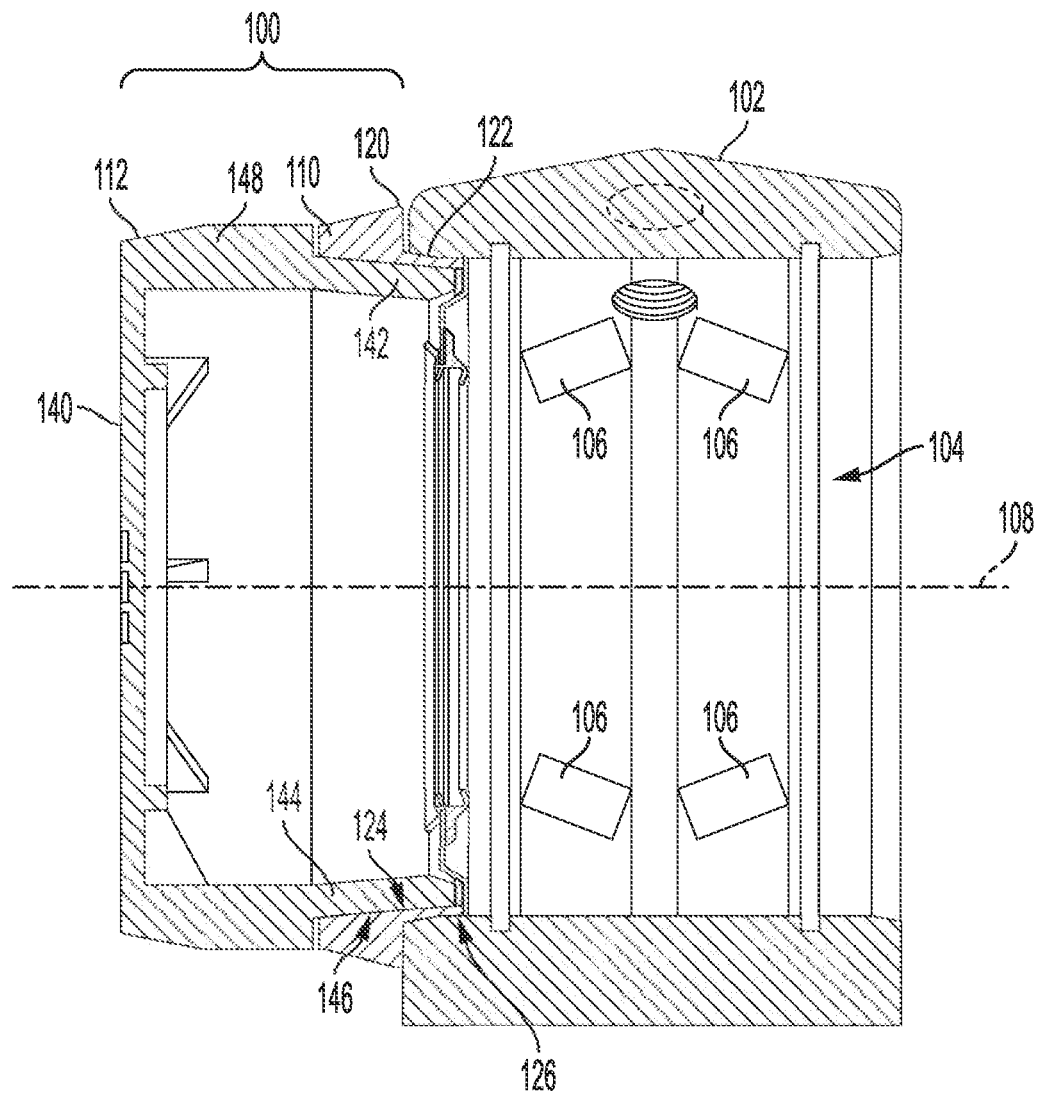
FIG. 4 is a cross-sectional view of the bearing cover assembly attached to the bearing housing illustrating radial expansion of the annular adapter by the end cap inserted therein.

The end cap 112 can be a cup-shaped structure including an axial face panel 140 oriented normal to the axis line 108 and a rearward extending tapered insert 142 that projects axially rearward from the axial face panel 140. The tapered insert 142 can be an annular structure, as indicated in FIG. 4, and extends around the axis line 108 such that the interior of the end cap 112 is hollow. The tapered insert 142 can include an annular circumferential wall 144 that that may have an outer diameter that corresponds to the inner diameter defined by the annular adapter 110. Moreover, the circumferential wall 144 can have a tapered outer surface 146 that tapers radially inwardly as the circumferential wall extends rearward from the axial face panel 140. The tapered outer surface 146 can be the same or similar to that of the tapered inner annular surface 124 of the annular adapter 110.

Formed proximate the intersection between the axial face panel 140 and the tapered insert 142 can be an enlarged head 148 that radially protrudes with respect to the circumferential wall 144. The enlarged head 148 can be diametrically coextensive with the axial face panel 140 and may extend, for example, approximately half the axial length of the end cap 112. To accommodate the first and second latch arms 130, 132 projecting axially forward of the annular adapter 110, a first cutout 150 and a second cutout 152, corresponding in shape to the latch arms, can be formed in the enlarged head 148. The first and second cutouts 150, 152 can be located at directly opposite sides of the circumference of the enlarged head 148 and are oriented axially rearward so that, when the annular adapter 110 and end cap 112 are mated, the first and second latch arms 130, 132 can be received in the respective first and second cutouts 150, 152.

To engage with the latch arms 130, 132, a first recess 154 and a second recess 156 can be radially disposed into the circumferential wall 144 without breaking through to the interior of the end cap 112. However, in the event the annular adapter 110 includes only a single latch arm, only a single recess may be required. The first and second recesses 154, 156 can be located completely within the cutouts 150, 152 or may axially extend rearward over a part of the tapered outer surface 146. The first and second recesses 154, 156 can be generally rectangular in shape and can curve about the curvature of the circumferential wall 144 such that their arc length corresponds to the arc length of the first and second cutouts 150, 152.

As illustrated in FIGS. 2 and 4, to assemble the bearing cover assembly 100 to the bearing housing 102, the annular adapter 110 is axially aligned with the housing bore 104 and the adapter sleeve 122 is inserted therein, for example, by pressing the annular adapter 110 rearward into the housing bore 104. To facilitate insertion, the diameter of the adapter sleeve 122 can be reduced by radially compressing the annular adapter 110 via the split cut 128. The adapter sleeve 122 can be accommodated in the stepped clearance provided by offsetting the rolling element bearing 106 into the housing bore 104 and the intermediate shoulder flange 120 can abut against the axial face of the bearing housing 102. When the adapter sleeve 122 is inserted, the tapered inner annular surface 124 is concentrically disposed around the axis line 108.

To radially expand the annular adapter 110 within the housing bore 104 and retain the bearing cover assembly 100 to the bearing housing 102, the tapered insert 142 of the end cap 112 is axially aligned with and inserted into the adapter hole defined by the tapered inner annular surface 124 of the adapter sleeve 122. Because of the tapered outer surface 146, the outer diameter of the tapered insert 142 varies over its axial length such that the circumferential wall 144 will initially be spaced from the adapter sleeve 122 during insertion, then make sliding contact with the tapered inner annular surface 124 of the annular adapter 110. Further axial insertion of the end cap 112 into the annular adapter 110 by, for example, pushing results in an interference fit because the diameter of the tapered outer surface 146 of the circumferential wall 144 exceeds the relative diameter of the tapered inner annular surface 124 of the adapter sleeve 122. The interference fit causes the tapered insert 142 to radially displace the adapter sleeve 122 against the inner surface of the housing bore 104. The annular adapter 110, end cap 112, and housing bore 104 are radially constrained, mated, and fixed in place with respect to each other and thereby forcibly retained to the bearing housing 102. The radial expansions of the annular adapter 110 against the housing bored 104 also enables the bearing cover assembly 100 to remain secured to the bearing housing 102 even if the structures are subject to thermal expansion and contraction due to changes in the operating temperatures.

To prevent the end cap 112 from axially backing out of the annular adapter 110, the first and second latch arms 130, 132 extending axially forward of the intermediate shoulder flange 120 can align with the respective first and second cutouts 150, 152 and make sliding contact over the circumferential wall 144 of the tapered insert 142. As the first and second latch arms 130, 132 slide over the circumferential wall 144, they can be displaced radially outwards in a cantilevered manner by the tapered outer surface 146 until the radially inward directed barbs 134 are received in the first and second recesses 154, 156 disposed into the circumferential wall 144. The resilient material of the annular adapter 110 enables the latch arms 130, 132 to radially press the radially inward directed barbs 134 into the recesses 154, 156 and against the curved surfaces to grip the circumferential wall 144. Further, the edges of the recesses 154, 156 can catch the radially inward directed barbs 134 if they axially slide backwards and thereby positively retain the annular adapter 110 to the end cap 112.

Figure 5:
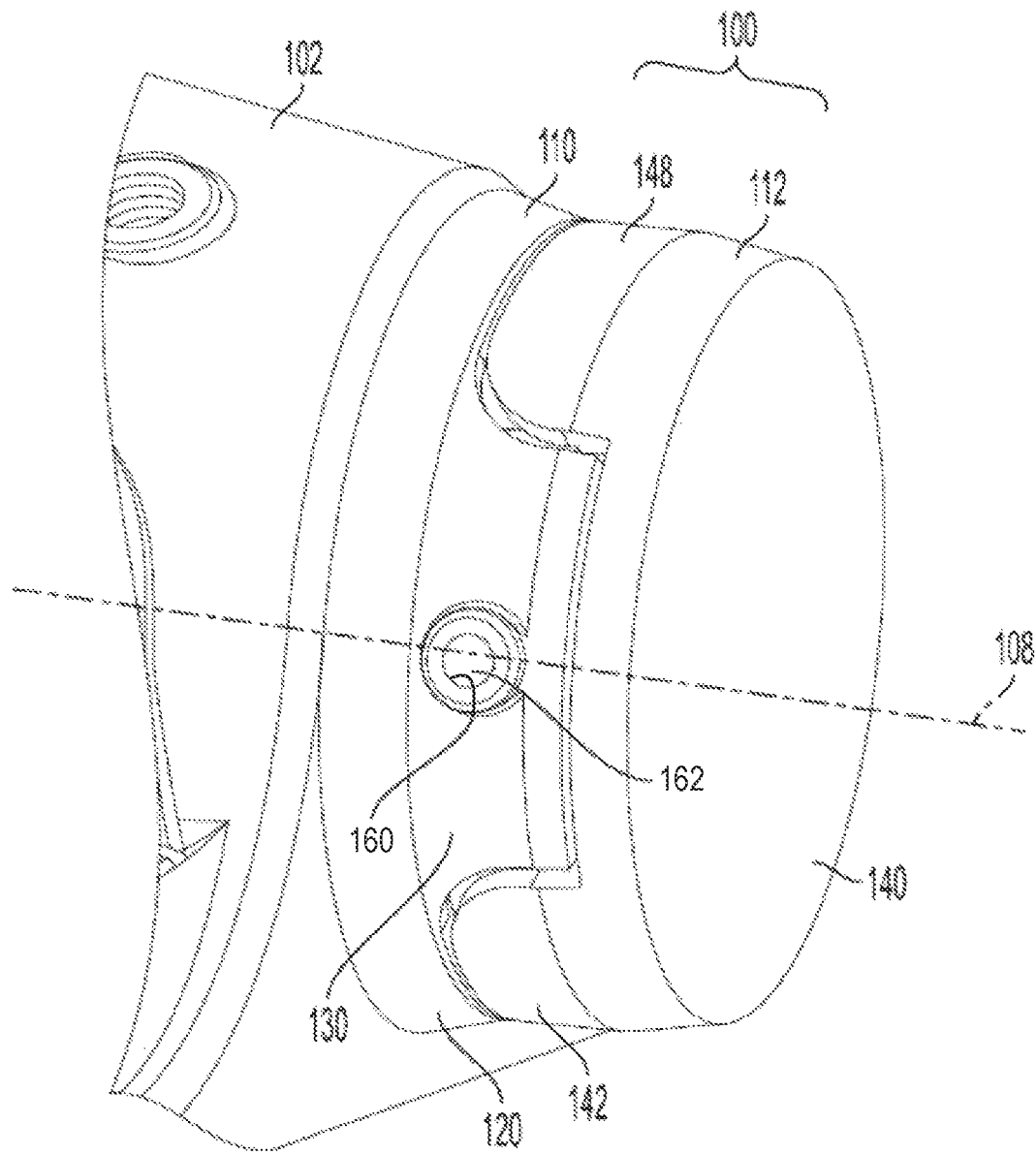
FIG. 5 is a perspective view of the bearing cover assembly attached to the bearing housing illustrating set screws that may be threaded into the annular adapter to radially bear on the end cap inserted into the adapter.

To release the end cap 112 from the annular adapter 110 and disassemble the bearing cover assembly 100 from the bearing housing 102, for example, to service the rolling element bearing, the first and second latch arms 130, 134 as illustrated in FIGS. 3 and 5 can each include a hole 160 configured to receive a threaded set screw 162. The holes 160 and set screws 162 can be directed radially toward the axis line 108 and can be oriented to radially bear on the first and second recesses 154, 156 of the tapered insert 142 disposed within the annular adapter 110. The holes 160 and set screws 162 may be at directly opposite locations with respect to the circumference of the annular adapter 110. When the set screws 162 are tightened radially inward, they can push off and displace the first and second latch arms 130, 132 with respect to the circumferential wall 144 and release the radially inward directed barbs 134 from the recesses 154, 156. That allows the end cap 112 to be axially removed from the annular adapter 110. Thereafter, to remove the annular adapter 110 from the housing bore 104, the annular adapter can be radially compressed, by, for example, radially squeezing the split cut 128 closed and disengaging the adapter sleeve 122 from the housing bore 104. Accordingly, the bearing cover assembly 100 can be assembled to and removed from a bearing housing 102 already installed on equipment in the field.

Figure 6:
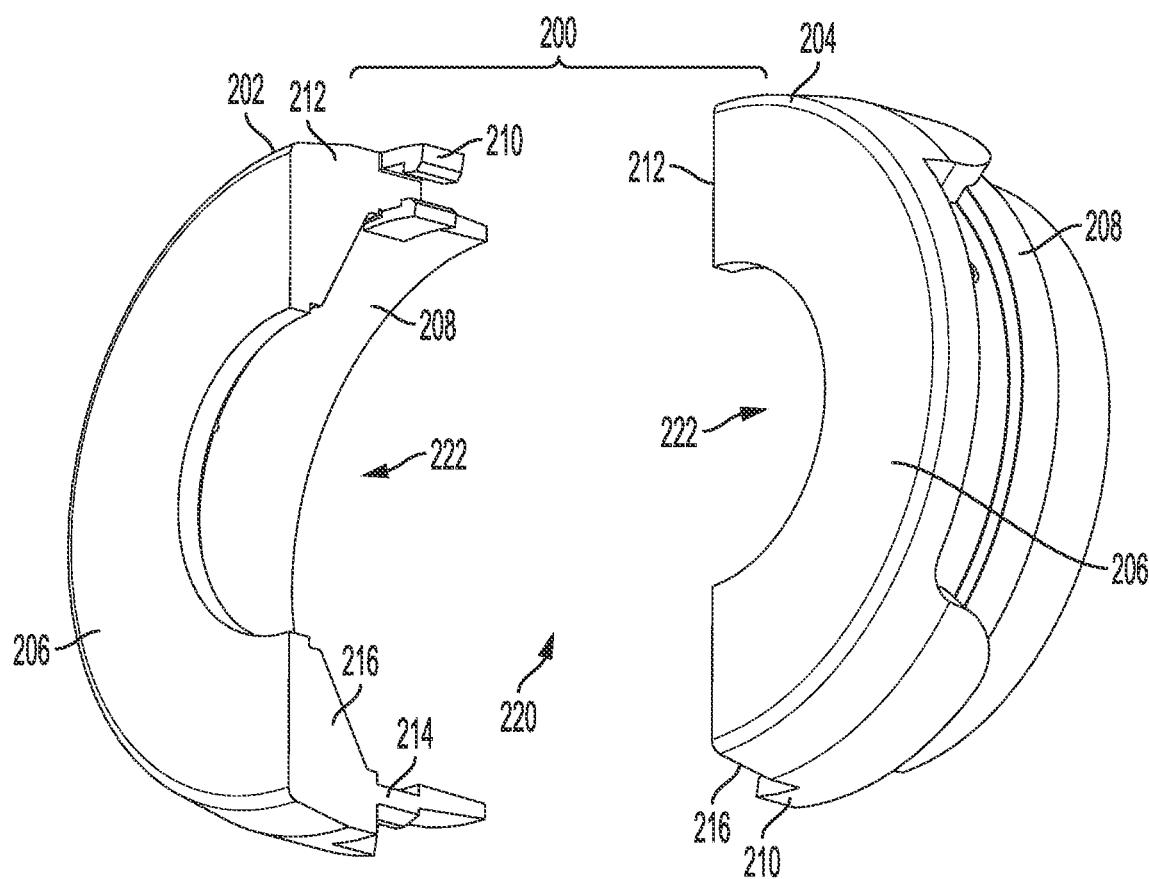
FIG. 6 is a perspective assembly view of an embodiment of the end cap that may be constructed from two complementary parts.

The end cap of the bearing cover assembly can have other configurations and features to facilitate access to the rolling element bearing and/or the shaft supported therein. For example, referring to FIG. 6, the end cap 200 can have a multi-part construction and can include a first semicircular part 202 and a second semicircular part 204. The first and second semicircular parts 202, 204 can be identical in shape, complementary to each other, and, when arranged in mirrored opposition, can be clamped together to produce the end cap 200. The first and second semicircular parts 202 can each include structures that correspond to the axial face panel 206 and the rearward extending tapered insert 208, which may have the same configuration generally described above.

To clamp the first and second semicircular parts 202, 204 together, they can include a clamp 210 located on one interfacing surface 212 and a tongue 214 located on a second interfacing surface 216. The clamp 210 can be a bifurcated structure that is adapted to receive and lock down on the tongue 214 when the first and second interfacing surfaces 212, 216 are positioned against each other. The clamp 210 and tongue 214 therefore hold the end cap 200 together.

To enable access to the rolling element bearing and/or the shaft, the axial face panel 206 can be configured with a central aperture 220 disposed there through. The central aperture 220 can be produced by two semi-apertures 222 disposed in the first and second semicircular parts 202, 204 and can be concentrically aligned with the axis line 108 of the bearing housing 102. The central aperture 220 can accommodate instruments such as, for example, purge valves for re-lubricating the bearing, speed sensors for measuring the speed of the rotating shaft, and other functions. In another example, the rotating shaft may extend through the central aperture 220 to protrude from the end cap 200.

Figure 7:
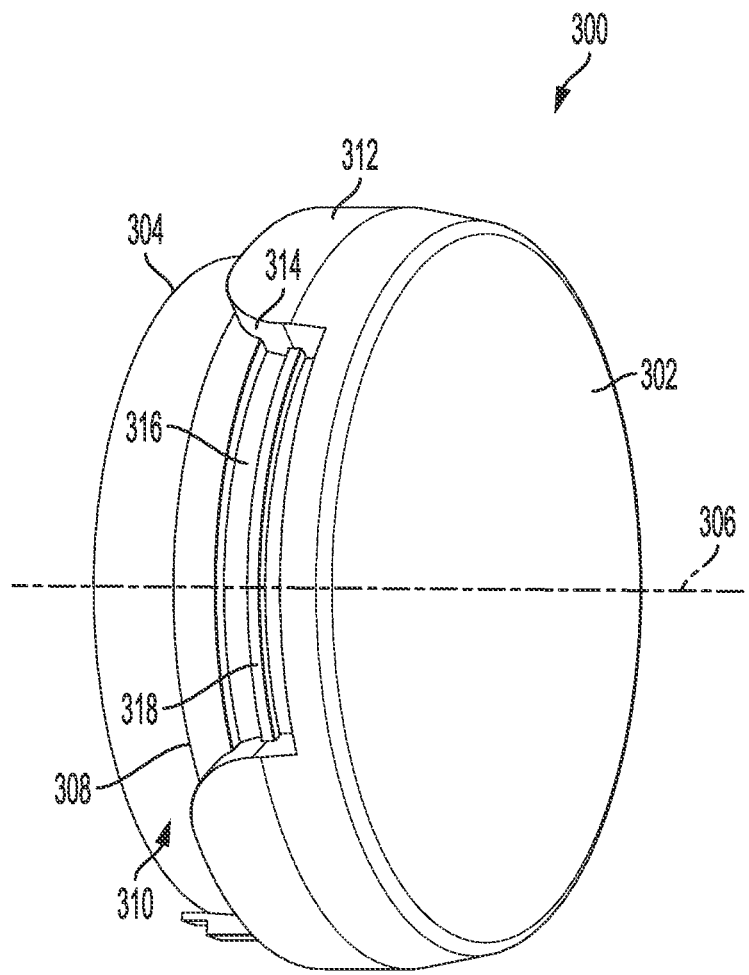
FIG. 7 is a perspective assembly view of an embodiment of the end cap that may be configured to form a snap-fit connection with the annular adapter.

Referring to FIG. 7, there is illustrated a version of the end cap 300 configured to form a snap-fit when mated with the annular adapter 110 of the type described above. Similar to the end caps described above, the end cap 300 includes an axial face panel 302 and a tapered insert 304 extending axially rearward from the axial face panel 302 with respect to an axis line 306. To radially expand the annular adapter 110, the tapered insert 304 includes a circumferential wall 308 with a tapered outer surface 310. The circumferential wall 308 can have a smaller, tapering diameter than the enlarged head 312 associated with the axial face panel 302. The enlarged head 312 includes cutouts 314 to accept the latch arms 130, 132 extending forwardly from the annular adapter 110. To form the snap-fit, the circumferential wall 308 of the tapered insert 304 can include first and second recesses 316 on opposite sides of the circumference of the tapered insert 304 and which may have a rectangular outline. The recesses 316 can be located in the cutouts 314 disposed partially into the circumferential wall 308. Located in the recesses 316 can be a radial ledge 318 rising outwardly in the recesses. The radial ledge 318 can follow the circumferential curve of the circumferential wall 308 about the axis line 306 and can be located approximately axial mid-width of the rectangular recesses 316. When the end cap 300 is inserted into the annular adapter 110, the radially inward directed barbs 134 on the latch arms 130, 132 can slide along the circumferential wall 304, be received in the recesses 316, and deflect over the radial ledge 318 to interlock the end cap 300 and annular adapter 110 together. The radial ledge 318 catches the radially inward directed barbs 134 and thereafter can prevent the annular adapter 110 from axially backing off the end cap 300.

Figure 8:
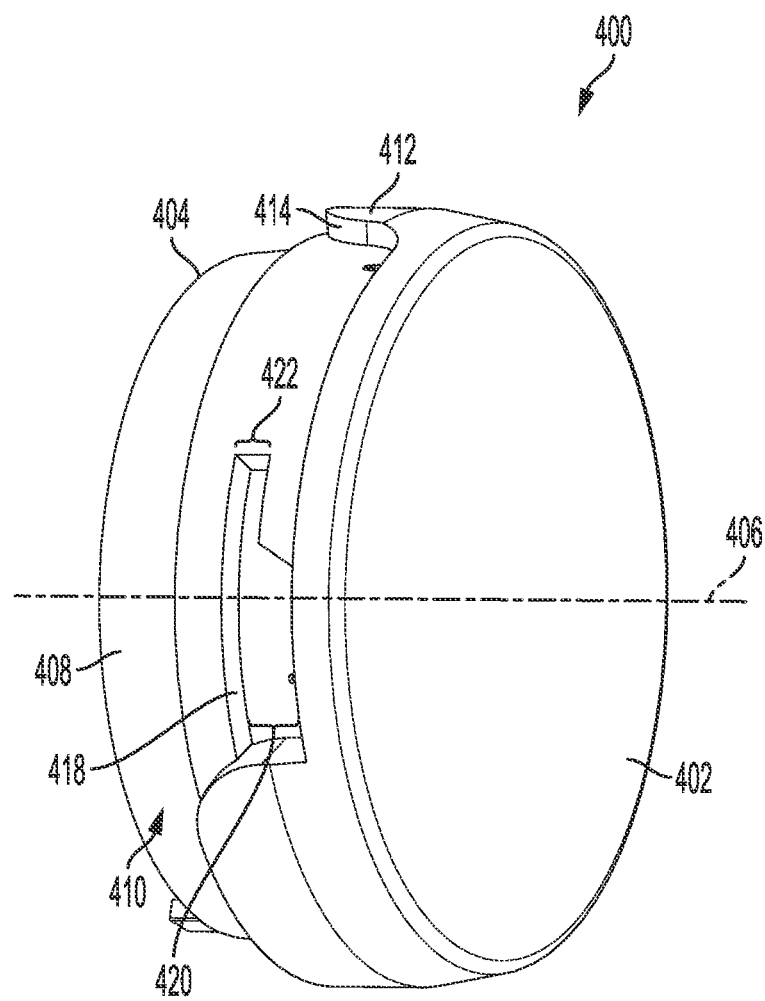
FIG. 8 is a perspective assembly view of an embodiment of the end cap that may be configured to form a bayonet mount with the annular adapter.

Referring to FIG. 8, there is illustrated a version of the end cap 400 configured to form a bayonet mount with the annular adapter 110 of the type described above. The end cap 400 again includes an axial face panel 402 and a tapered insert 404 axially extending from the axial face panel 402 with respect to an axis line 406. The tapered insert 404 also includes a circumferential wall 408 with a tapered outer surface 410 to radially expand the annular adapter 110. Disposed in the enlarged head 412 on circumferential opposite sides of the end cap 400 can be first and second cutouts 414 or recesses to accommodate the latch arms 130, 132 extending forwardly on the annular adapter 110. Disposed into the cutouts 414 and radially into the material of the end cap 400 can be a respective bayonet slot 418 which is configured to form a twist lock with the radially inward directed barbs 134 on the latch arms 130, 132 of the annular adapter 110. The bayonet slot 418 follows the circumferential curve of the end cap 400 and extends as an arc partially about the axis line 406. The bayonet slot 418 can have a first axial width 420 and a second axial width 422 that is of a smaller dimension than the first axial width 420 as measured with respect to the axis line 406. Further, the smaller second axial width 422 can be axially offset with respect to the first axial width 420.

To assemble the end cap 400 to the annular adapter 110, that latch arms 130, 132 on the annular adapter 110 can be inserted into the cutouts 414 so that the radially inward directed barbs 134 are received in the wider first axial width 420 of the bayonet slot 418. Subsequently twisting the end cap 400 with respect to the annular adapter 110 will direct the radially inward directed barb 134 to the smaller second axial width 422 which can serve to axially position the end cap 400 with respect to the annular adapter 110 in a manner that can control the degrees of radial expansion of the bearing cover assembly.

The use of the terms "a," "an," "the," "at least one," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A bearing cover assembly comprising:
    an annular adapter comprising:
        an adapter sleeve axially insertable into a housing bore of a bearing housing, the adapter sleeve including a tapered inner annular surface;
        an intermediate shoulder flange extending between a first axial end and a second axial end thereof, the first axial end configured to abut against the bearing housing; and
        a first latch arm and a second latch arm each extending axially from the second axial end of the intermediate shoulder flange, the first latch arm and the second latch arm each including a radially inward directed barb at a distal end thereof, and
    an end cap comprising a tapered insert with a circumferential wall axially extending from an axial face panel and configured for insertion into the annular adapter, the circumferential wall including a tapered outer surface configured to slidingly engage the tapered inner annular surface and radially expand the adapter sleeve;
    wherein at least one of the first latch arm and the second latch arm is configured to radially bear on a portion of the end cap.

2. The bearing cover assembly of claim 1, wherein at least one of the first latch arm and the second latch arm is configured to radially bear on the tapered outer surface of the end cap.

3. The bearing cover assembly of claim 1, wherein at least one of the first latch arm and the second latch arm includes a fastener therein and oriented to radially bear on the tapered outer surface of the end cap.

4. The bearing cover assembly of claim 3, wherein the fastener is threaded.

5. The bearing cover assembly of claim 3, wherein the fastener is a setscrew.

6. The bearing cover assembly of claim 1, wherein the circumferential wall includes a first recess and a second recess each radially disposed into and arcing partially about the circumferential wall, the first recess configured to receive the radially inward directed barb of the first latch arm and the second recess configured to receive the radially inward directed barb of the second latch arm.

7. The bearing cover assembly of claim 6, wherein at least one of the first latch arm and the second latch arm is configured to radially bear on a respective one of the first recess and the second recess.

8. The bearing cover assembly of claim 6, wherein at least one of the first latch arm and the second latch arm includes a fastener therein and oriented to radially bear on a respective one of the first recess and the second.

9. The bearing cover assembly of claim 6, wherein the first recess and the second recess each include a radial ledge to form a snap-fit with the radially inward barbs of the first latch arm and the second latch arm.

10. The bearing cover assembly of claim 6, wherein the first recess and the second recess each include a bayonet slot to form a bayonet mount with the radially inward directed barbs of the first latch arm and the second latch arm.

11. The bearing cover assembly of claim 1, wherein the end cap is formed of a first semicircular part and a second semicircular part clamped together.

12. The bearing cover assembly of claim 11, wherein the end cap defines a central aperture when the first semicircular part and the second semicircular part are clamped together.

13. The bearing cover assembly of claim 1, wherein the annular adapter defines a split cut facilitating radial expansion of the annular adapter.

14. The bearing cover assembly of claim 13, wherein the split cut axially traverses the annular adapter.

15. A method of disassembling a bearing cover assembly from a bearing housing, comprising:

providing a fastener in a radially extending hole in a latch arm of an annular adapter, the latch arm having a radially inward directed barb disposed thereon; and radially pressing the fastener against a circumferential wall of an end cap thereby radially outwardly displacing the radially inward directed barb with respect to the circumferential wall thereby releasing the radially inward directed barb from the end cap.

16. The method of claim 15, further comprising:

removing the end cap from the annular adapter by axially slidingly disengaging a tapered outer surface of the circumferential wall of the end cap from a tapered inner annular surface of the annular adapter.

17. The method of claim 16, further comprising:

radially compressing the annular adapter and axially pulling the annular adapter out of a housing bore of the bearing housing to remove the annular adapter from the bearing housing.

18. The method of claim 15, wherein after the radially pressing step, further comprising twisting the end cap with respect to the annular adapter to disengage the radially inward directed barb from a bayonet slot disposed in a recess radially disposed into the circumferential wall of the end cap.

19. The method of claim 15, wherein the fastener is oriented to radially bear on a tapered outer surface of the circumferential wall of the end cap.

20. The method of claim 15, wherein the fastener is oriented to radially bear on a recess radially disposed into the circumferential wall of the end cap.

21. The method of claim 15, wherein an adapter sleeve extends axially from a first portion of the annular adapter and the latch arm extends axially from a second portion of the annular adapter, the second portion being opposite the first portion.

* * * * *